(12) United States Patent
Xu et al.

(10) Patent No.: US 12,215,211 B2
(45) Date of Patent: Feb. 4, 2025

(54) MULTI-STAGE FOAM SOUND-ABSORBING BLACK BODY MATERIAL AND PREPARATION METHOD THEREOF

(71) Applicant: ZHEJIANG UNIVERSITY, Zhejiang (CN)

(72) Inventors: Zhen Xu, Zhejiang (CN); Xiaoting Liu, Zhejiang (CN); Kai Pang, Zhejiang (CN); Chao Gao, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/115,753

(22) Filed: Feb. 28, 2023

(65) Prior Publication Data

US 2023/0203267 A1 Jun. 29, 2023

Related U.S. Application Data

(63) Continuation of application No. PCT/CN2022/086668, filed on Apr. 13, 2022.

(30) Foreign Application Priority Data

Apr. 14, 2021 (CN) .......................... 202110398409.3

(51) Int. Cl.
 *C08J 9/40* (2006.01)
 *C08J 9/35* (2006.01)

(52) U.S. Cl.
 CPC . *C08J 9/40* (2013.01); *C08J 9/35* (2013.01); *C08J 2205/044* (2013.01); *C08J 2375/04* (2013.01); *C08J 2379/02* (2013.01)

(58) Field of Classification Search
 CPC ... C04B 14/024; C04B 16/08; C04B 2111/52; C04B 30/00; C04B 32/02; C04B 38/02;
 (Continued)

(56) References Cited

U.S. PATENT DOCUMENTS

| | | | |
|---|---|---|---|
| 2015/0259212 A1 | 9/2015 | Li et al. | |
| 2019/0139527 A1 | 5/2019 | Cao | |

FOREIGN PATENT DOCUMENTS

| | | |
|---|---|---|
| CN | 104627995 A | 5/2015 |
| CN | 110582532 A | 12/2019 |

(Continued)

OTHER PUBLICATIONS

International Search Report Dated Jul. 20, 2022 for corresponding PCT Application No. PCT/CN2022/086668 along its English Translation.

(Continued)

*Primary Examiner* — Alex A Rolland

(57) ABSTRACT

In the present invention, a multi-stage foam sound-absorbing black body material is provided for the first time. A graphene aerogel is introduced into a commercialized polymer foam skeleton by using a solvent plasticizing and foaming technology, so as to embed ultra-thin graphene drums in the foam skeleton. When sound waves enter the foam black body, a large number of graphene drums generate a severe resonance effect, thereby rapidly achieving attenuation of the sound waves, and combined with the friction loss of the porous structure of the polymer foam on the sound waves, excellent sound-absorbing performance is achieved in a wide frequency range. The present solution is provided on the basis of commercialized foam materials, has a simple method, low costs, and the potential of wide industrial application.

6 Claims, 3 Drawing Sheets

(58) Field of Classification Search
CPC ............... C04B 38/08; C08J 2201/038; C08J 2205/044; C08J 2361/28; C08J 2375/04; C08J 2379/02; C08J 9/35; C08J 9/40–42
See application file for complete search history.

(56) References Cited

FOREIGN PATENT DOCUMENTS

| | | | | |
|---|---|---|---|---|
| CN | 112919928 A | 6/2021 | | |
| WO | WO-2018157208 A1 * | 9/2018 | ............ | C08J 9/0066 |
| WO | WO 2021067538 A1 | 4/2021 | | |

OTHER PUBLICATIONS

Written Opinion of the International Searching Authority Dated Jul. 20, 2022 for corresponding PCT Application No. PCT/CN2022/086668 along its English Translation.

First Notice of Examination Opinions Dated Oct. 9, 2021 for corresponding Chinese Application No. 202110398409.3 along its Engligh Translation.

* cited by examiner

MULTI-STAGE FOAM SOUND-ABSORBING BLACK BODY MATERIAL AND PREPARATION METHOD THEREOF

CROSS-REFERENCE TO RELATED APPLICATIONS

The present application is a Continuation Application of PCT Application No. PCT/CN2022/086668, filed on Apr. 13, 2022, which claims the priority of Chinese Patent Application No. 202110398409.3, filed on Apr. 14, 2021, the entire contents of which are hereby incorporated by reference.

TECHNICAL FIELD

The invention belongs to the technical field of functional materials, and particularly relates to a sound-absorbing black body foam material and a preparation method thereof.

DESCRIPTION OF THE PRIOR ART

Sound-absorbing materials are widely used and play an important role in many fields, such as personal protection, electrical protection and architectural design. About ⅕ people around the world are suffering from hearing impairment and the number is growing rapidly. Therefore, it is very important to explore acoustic sound-absorbing materials having high performance. As a traditional sound-absorbing material, polymer foams have been widely used in various fields because of their highly porous structure, and the basic principle of its sound-absorbing property depends mainly on the friction of sound waves inside the porous holes to produce attenuation. At present, many researches have been carried out to optimize the sound-absorbing performance of polymer foams by controlling the pore size and the pore structure thereof, but the traditional materials are difficult to meet the increasing acoustic requirements. By adding functional nanomaterials such as graphene, carbon nanotubes, nanofibers and the like to the polymer foam, the sound-absorbing performance can also be enhanced. However, the sound-absorbing performance increased by the addition of nano-fillers is based on the increase of the contact area between sound wave and skeleton, thereby further increasing the friction loss of sound wave. Essentially, there is no fundamental breakthrough in sound absorption.

Graphene was discovered in 2004 by Konstantin Novoselov and Andre K. Geim from the University of Manchester, England. It is a monatomic layer structure of graphite, with a regular hexagonal network and a honeycomb-like two-dimensional structure of sp2 hybrid carbon atoms, showing many charming characteristics. In the field of nanomechanical vibration, graphene has a low in-plane rigidity and a thickness of a monatomic layer, so that the resulted graphene drums can generate a greater out-of-plane deformation, with an obvious resonance effect from low frequency to ultra high frequency. Therefore, it is an ideal candidate to utilize its vibration effect to attenuate the sound wave. However, graphene drums as an acoustic absorbing material still exists some disadvantages. First, ultra-thin graphene drums are difficult to be assembled into macroscopic materials for daily use. Although the aerogel can assemble the graphene of nanometer thickness in the three-dimensional porous material, the sheets with a poor connection therebetween are not fixed to form the nanographene drums, so that sheet slippage are likely to occur when vibrating, affecting its sound-absorbing ability. Further, due to the high cost of graphene, it is still not ideal to use graphene alone for large-scale production. By directly fixing the sheets of graphene inside the polymer foam, graphene tends to pile up layer by layer, which seriously breakdowns the ultra-thin vibration characteristic of graphene. Therefore, there are still great challenges in the preparation of new sound-absorbing materials with high performance.

The invention provides a composite material using polymer foam and graphene drum to improve the sound-absorbing performance significantly and can be used as an acoustic black body. By embedding the graphene oxide into the polymer foam, and then using solvent plasticizing and foaming technology to achieve the foaming of graphene oxide in the foam walls, thereby forming an ultra-thin graphene drum structure, fully utilizing the vibration characteristic of graphene drum on the commercial foam. Not only the black body material obtained has the best sound-absorbing effect and the widest sound-absorbing frequency by now, but also the method is simple and the cost is low, which is conducive to the large-scale application of the sound-absorbing black body in daily life.

SUMMARY OF THE DISCLOSURE

The invention provides a multi-stage foam sound-absorbing black body material including a polymer foam skeleton having a pore size of 10 um or more and a continuous graphene resonance cavity attached to the skeleton. The wall of the graphene resonant cavity is graphene having a thickness of 100 nm or less. The polymer foam skeleton forms a primary foam structure, and the graphene resonant cavity forms a secondary foam structure. The secondary foam structure can be used as an effective sound-absorbing unit to form a Helmholtz-like resonant cavity with the primary foam structure. When the sound enters the primary foam structure, friction loss occurs between the sound wave and the framework of the primary foam structure, which is transmitted to the secondary foam structure, and the graphene resonates to further realize the sound wave energy loss, which is widely used in the field of sensing, electromagnetic shielding and acoustic management.

The commercial polymer foam is a common sound-absorbing foam material, such as polyurethane foam, melamine foam.

The sound-absorbing black body foam material according to the present invention is prepared by immersing a polymer foam in a dispersion liquid of graphene oxide, where the graphene oxide is filled into the inner of the foam (or accelerating the graphene filling by vacuum pouring), placing the obtained foam in a foaming agent solution for foaming after drying, and drying after foaming to obtain a multi-stage foam sound-absorbing black body material.

Further, the graphene oxide can be prepared by a Hummers method, an improved Hummers method, an electrochemical method, or the like.

Further, the concentration of the dispersion liquid of the graphene oxide is 0.1-50 mg/g, wherein the higher the concentration of the graphene oxide is, the higher the content of the obtained secondary foam structure is.

Further, the foaming agent solution is one of hydrazine hydrate solution, sodium borohydride solution, sodium bicarbonate solution and sodium carbonate solution.

Further, chemical reduction or thermal reduction is further performed after foaming. The reducing agent for the chemical reduction is one of the common reducing agents such as hydroiodic acid, hydrazine hydrate, Vitamin C, ethylenediamine and the like, among which hydroiodic acid/ethanol reduction system is preferred.

The advantages of the invention are:

(1) By embedding the graphene drum nanostructure into the polymer foam, the sound-absorbing performance can be improved by 200-1000%. The average sound-absorbing coefficient at 100-10000 Hz can be 0.8 or more, wherein the average sound-absorbing coefficient at 200-6000 Hz can be 0.9 or more.

(2) Because the technology of polymer foam is mature and the cost is low, it is advantageous to realize the large-scale application of the sound-absorbing black body.

(3) The solvent plasticizing and foaming process is relatively simple, and no special drying process is needed, so it is more conducive to the industrialization process.

(4) The prepared sound-absorbing black body has excellent mechanical properties and can resist different deformation, so it can be applied in various cases.

DESCRIPTION OF EMBODIMENTS

The invention is further described below in connection with examples. However, the scope of the present invention is not limited thereto.

Example 1

Figure 1:
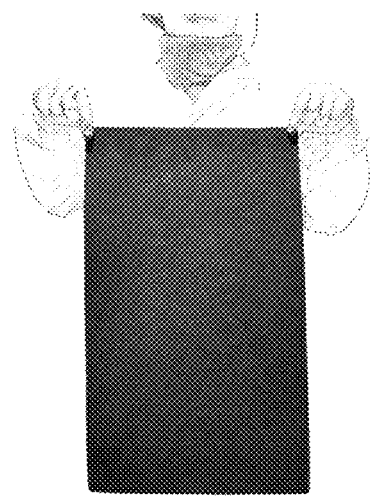
FIG. 1 is a physical view of the sound-absorbing foam black body material prepared according to Example 1.
Figure 2:
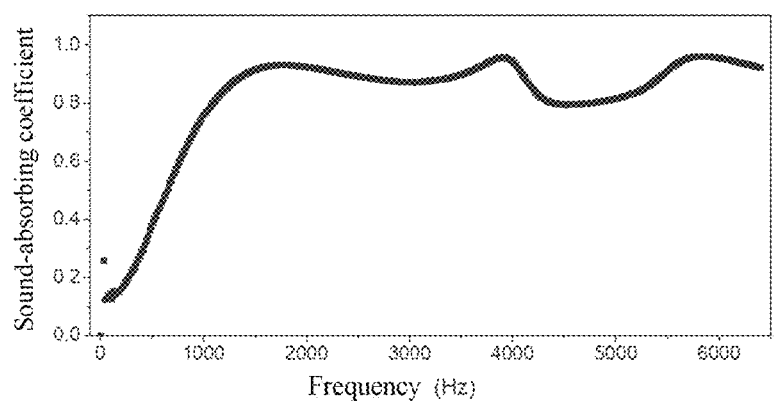
FIG. 2 shows a sound-absorbing curve of the sound-absorbing foam black body prepared according to Example 1 at 200-6000 Hz.
Figure 3:
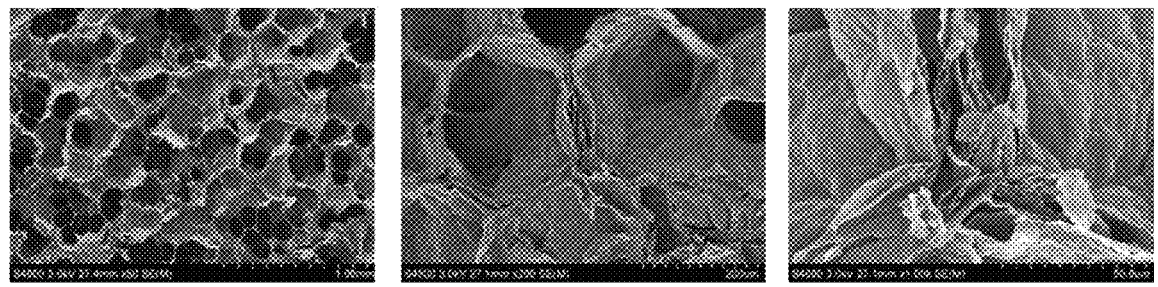
FIG. 3 is a scanning diagram of the sound-absorbing foam black body prepared according to Example 1.
Figure 4:
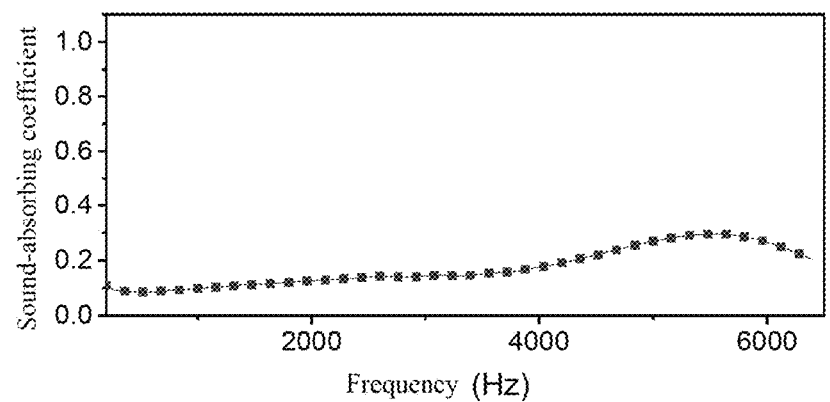
FIG. 4 shows a sound-absorbing curve of the foam prepared according to Comparative 1.
Figure 5:
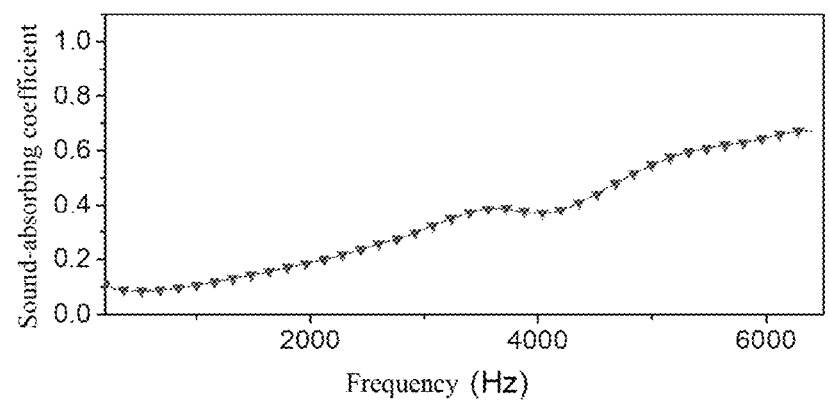
FIG. 5 shows a sound-absorbing curve of the foam prepared according to Comparative 2.

Melamine foam with a thickness of 20 mm (pore size of 50-200 um) was immersed with 10 mg/ml aqueous graphene oxide (purchased from Hangzhou Gaoxi Technology Co., Ltd., average size of 20 um) for 2 h, and then the dried foam was added into 30% hydrazine hydrate for foaming for 2 h. After natural drying, a multi-stage foam sound-absorbing black body material having high performance was obtained, as shown in FIG. 3, in which the wall thickness of graphene in the secondary foam structure was 20 nm, the average sound-absorbing coefficient at 100-10000 Hz was 0.78, and the average sound-absorbing coefficient at 200-6000 Hz was 0.86.

Example 2

Similar to Example 1, the melamine foam had a pore size of 50-200 um and a thickness of 30 mm, a multi-stage foam sound-absorbing black body material having high performance was obtained, in which the wall thickness of graphene in the secondary foam structure was 20 nm, the average sound-absorbing coefficient at 100-10000 Hz was 0.8, and the average sound-absorbing coefficient at 200-6000 Hz was 0.89.

Example 3

Similar to Example 2, the melamine foam was replaced with a polyurethane foam having a pore size of 10-100 um, a multi-stage foam sound-absorbing black body material having high performance was obtained, in which the wall thickness of graphene in the secondary foam structure was 15 nm, the average sound-absorbing coefficient at 100-10000 Hz was 0.75, and the average sound-absorbing coefficient at 200-6000 Hz was 0.83.

Example 4

Similar to Example 1, the concentration of graphene oxide was 5 mg/ml, a multi-stage foam sound-absorbing black body material having high performance was obtained, in which the wall thickness of graphene in the secondary foam structure was 12 nm, the average sound-absorbing coefficient at 100-10000 Hz was 0.65, and the average sound-absorbing coefficient at 200-6000 Hz was 0.71.

Example 5

Similar to Example 1, the hydrazine hydrate was replaced with a sodium borohydride solution of 1% by mass, a multi-stage foam sound-absorbing black body material having high performance was obtained, in which the wall thickness of graphene in the secondary foam structure was 50 nm, the average sound-absorbing coefficient at 100-10000 Hz was 0.77, and the average sound-absorbing coefficient at 200-6000 Hz was 0.87.

Comparative 1

Similar to Example 1, the foam immersed in the graphene oxide was directly chemically reduced to obtain a sample having an average sound-absorbing coefficient of 0.25 at 100-10000 Hz and an average sound-absorbing coefficient of 0.3 at 200-6000 Hz.

Comparative 2

Similar to Example 1, the melamine foam was not subjected to any treatment, the sample had an average sound-absorbing coefficient of 0.17 at 100-10000 Hz and 0.21 at 200-6000 Hz.

Application 1

Figure 6:
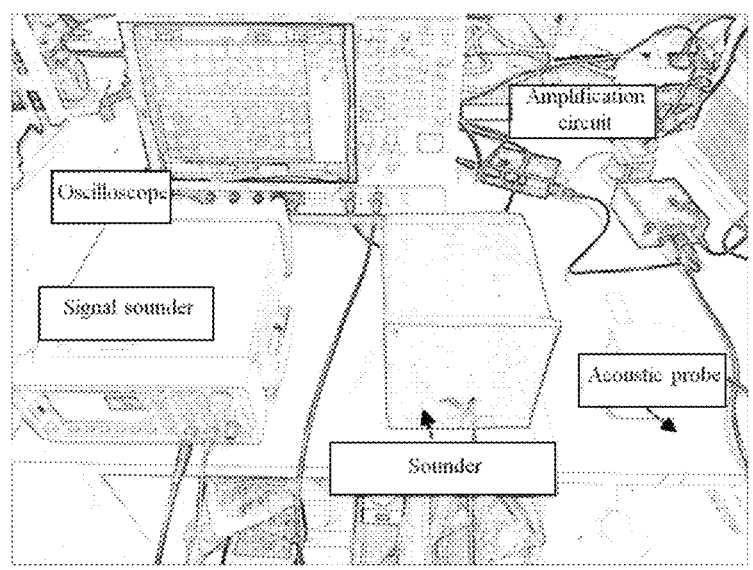
FIG. 6 is a schematic diagram of an apparatus constructed in Application 1.
Figure 7:
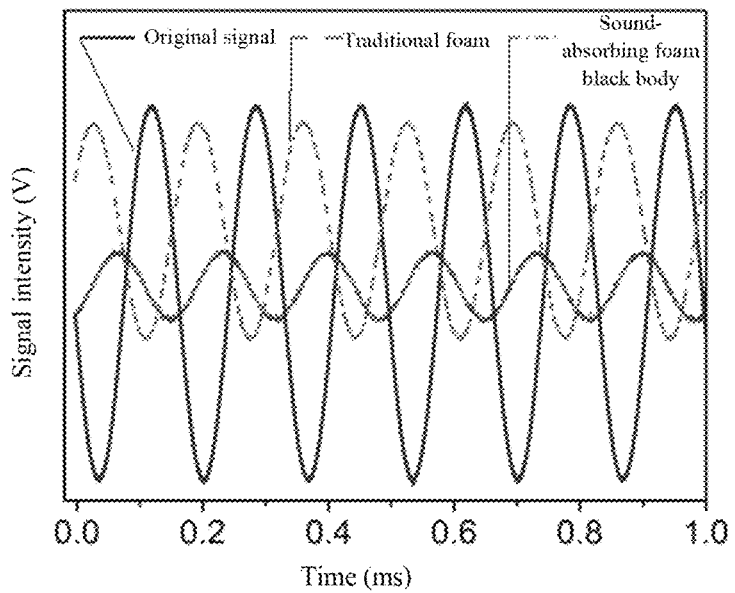
FIG. 7 shows the sound attenuation of the sound-absorbing foam black body according to Application 1 at the frequency of 200-6000 Hz.

As shown in FIG. 6, a sounder was placed in a sound-absorbing foam black body box prepared according to Example 1, wherein the sounder was driven by a signal sounder, and then the signal of the sound wave was detected by an acoustic probe, and was displayed on an oscilloscope in real time through an amplification circuit. The signal of the sound wave was detected without the sound-absorbing black body as a comparison. The results, as shown in FIG. 7, showed that the sound-absorbing black body foam prepared according to Example 1 had a higher attenuation rate for 200-6000 Hz of sound.

The invention claimed is:

1. A preparation method for a multi-stage foam sound-absorbing black body material, comprising the steps of:
   immersing a polymer foam into a graphene oxide dispersion, with graphene oxide of the graphene oxide dispersion filling into an interior of the polymer foam,
   drying the polymer foam filled with graphene oxide to obtain a dried foam;

adding the dried foam in a foaming agent solution for foaming, and drying after foaming to obtain the multi-stage foam sound-absorbing black body material;

wherein the multi-stage foam sound-absorbing black body material comprises a polymer foam skeleton having a pore size of 10 μm or more and a continuous graphene resonant cavity attached thereto, wherein a cavity wall of the graphene resonant cavity is graphene having a thickness of 100 nm or less; and wherein the polymer foam skeleton forms a primary foam structure, and the graphene resonant cavity forms a secondary foam structure.

2. The preparation method according to claim 1, wherein the graphene oxide is prepared by a Hummers method, an improved Hummers method or an electrochemical method.

3. The preparation method according to claim 1, wherein the graphene oxide dispersion has a concentration of 0.1-50 mg/g.

4. The preparation method according to claim 1, wherein the foaming agent solution is one of hydrazine hydrate solution, sodium borohydride solution, sodium bicarbonate solution and sodium carbonate solution.

5. The preparation method according to claim 1, further comprising chemically or thermally reducing the foam after the foaming.

6. The preparation method according to claim 1, wherein the multi-stage foam sound-absorbing black body material has an average sound-absorbing coefficient of 0.8 or more at 100-10000 Hz.

* * * * *